(12) United States Patent
Won et al.

(10) Patent No.: US 7,864,961 B2
(45) Date of Patent: Jan. 4, 2011

(54) METHOD OF MANAGING A MOBILE MULTICAST KEY USING A FOREIGN GROUP KEY

(75) Inventors: Yoo Jae Won, Gyeonngi-do (KR); Mi Youn Yoon, Seoul (KR); Seung Goo Ji, Seoul (KR); Kyu Cheol Oh, Seoul (KR)

(73) Assignee: Korea Information Security Agency (KR)

( * ) Notice: Subject to any disclaimer, the term of this patent is extended or adjusted under 35 U.S.C. 154(b) by 668 days.

(21) Appl. No.: 11/941,437

(22) Filed: Nov. 16, 2007

(65) Prior Publication Data
US 2008/0123856 A1 May 29, 2008

(30) Foreign Application Priority Data
Nov. 24, 2006 (KR) .................. 10-2006-0117111

(51) Int. Cl.
H04L 9/00 (2006.01)
(52) U.S. Cl. ..................................... 380/277
(58) Field of Classification Search ................ 380/247, 380/248, 277, 279, 286; 713/163, 168; 455/411, 455/432.1, 439
See application file for complete search history.

(56) References Cited

U.S. PATENT DOCUMENTS

| | | | |
|---|---|---|---|
| 6,195,751 B1 * | 2/2001 | Caronni et al. ............... 713/163 |
| 6,584,566 B1 * | 6/2003 | Hardjono ..................... 713/163 |
| 7,103,359 B1 * | 9/2006 | Heinonen et al. ............ 455/436 |
| 7,107,051 B1 * | 9/2006 | Walker ....................... 455/432.1 |
| 7,539,313 B1 * | 5/2009 | Hardjono et al. ............. 380/278 |
| 2002/0174366 A1 * | 11/2002 | Peterka et al. ............... 713/201 |
| 2006/0271780 A1 * | 11/2006 | Oswal et al. ................ 713/163 |
| 2007/0055870 A1 * | 3/2007 | Bruti et al. .................. 713/168 |
| 2007/0297613 A1 * | 12/2007 | Ghosh ......................... 380/277 |
| 2008/0130547 A1 * | 6/2008 | Won et al. ................... 370/312 |

* cited by examiner

Primary Examiner—Beemnet W Dada
(74) Attorney, Agent, or Firm—Thomas, Kayden, Horstemeyer & Risley, LLP

(57) ABSTRACT

The present invention relates to a method of managing a mobile multicast key using a foreign key. More specifically, the present invention relates to a method of managing a mobile multicast key using a foreign key for secure communication between a mobile terminal and a secure relay server in the region where microwaves from plural access points overlap. A method of managing a mobile multicast key using a foreign key according to the present invention has an advantage that multicast secure relay servers perform delegated authentication in advance in a region where microwaves overlap, thus reducing a delay time for authentication in a mobile terminal and it has an advantage that it can minimize an effect from changes in group keys that user's movement make, by using a primary group key and a foreign key. This results in a reduction of an overhead from update of a group key while moving, and accordingly a reduction of a delay time. In addition, it has an advantage that it centralizes functions of key management to a secure relay server, thus overcoming the limitations on processing ability or network bandwidth of a mobile terminal.

8 Claims, 3 Drawing Sheets

METHOD OF MANAGING A MOBILE MULTICAST KEY USING A FOREIGN GROUP KEY

BACKGROUND OF THE INVENTION

1. Field of the Invention

The present invention relates to a method of managing a mobile multicast key using a foreign group key. More specifically, the present invention relates to a method of managing a mobile multicast key using a foreign group key for secure communication between a mobile terminal and a secure relay server in the region where microwaves from plural access points overlap.

2. Background of the Related Art

Any discussion of the prior art throughout the specification should in no way be considered as an admission that such prior art is widely known or forms part of common general knowledge in this field.

Multicast is a method of simultaneously forwarding data such as a video or voice to more than two receivers in a wired or wireless network. Multicast is opposite of unicast, in which data are transmitted to a single specific receiver. Multicast is generally used to provide multimedia stream services in real-time for systems such as internet protocol-television (IP-TV) or video conference system. And such conventional multicast has disadvantages in that even a brief delay or packet loss can cause image-pausing or any other problems in providing consistent services.

Mobile multicast technology enables a multicast node to communicate with the other multicast nodes in the network when the multicast node moves and changes its access point in the network. The technology can provide a stream to multiple receivers simultaneously and block redundant transmission of data, and thus prevent wasting bandwidth and reduce transmission overhead. These are the advantages of mobile multicast technology over a unicast-based network. In other word, mobile multicast technology combines mobility with multicast technology, one of the key next-generation technologies.

However, mobile multicast requires solutions to security threats resulting from mobility as well as security threats which have existed in a conventional wired network. As examples of the security threats in mobile multicast, a normal user fails to receive services, due to a server masquerading as a normal server or due to a malicious mobile node transmitting a fake join message or leave message. To solve such security threats, technologies for user authentication and encryption which can support mobility are required.

As mentioned above, multicast has a difficulty in providing consistent services because of a brief delay or packet loss. And a delay becomes a bigger problem in mobile multicast since mobile multicast requires changes of secure relay servers.

In mobile multicast communication, a user is provided with services from access points, moving from one cell to the other. Accordingly, there are needs for user authentication for authenticating a user and updating a group key when he or she moves, and key distribution protocols for sharing a group key. When designing mobile multicast security, one must consider the characteristics of a mobile terminal such as computing power and batteries and so on. In addition, mobile multicast security must be designed in the respects of security, appropriateness and optimality. Security is for showing if a protocol which is made for mobile multicast security is secure, appropriateness for showing if the protocol satisfies the requirements for wireless environment, and optimality for showing if the protocol is superior and effective.

When providing services for a user of a mobile terminal, access points are required to first identify the mobile terminal and securely distribute a group key, which is used to protect multicast data. Accordingly, a method for identification and a protocol for distributing a group key are required to resolve security issues of mobile multicast service.

SUMMARY OF THE INVENTION

Accordingly, the present invention is directed to a method of managing a mobile multicast key using a foreign group key that substantially obviates one or more problems due to limitations and disadvantages of the related art.

An object of the present invention is to provide a method of managing a mobile multicast key using a foreign group key, which can provide a mobile terminal using mobile multicast with consistent services without disconnection.

Another object of the present invention is to provide a method of managing a mobile multicast key using a foreign group key, which can solve security threats of a mobile terminal using mobile multicast.

To accomplish the above objects, according to one aspect of the present invention, there is provided a method of managing a mobile multicast key using a foreign group key, which comprises: a first step of allowing a first secure relay server to search a list of secure relay servers which are connected to the access point controlling a region where microwaves to the mobile terminal overlap, to find a second secure relay server; a second step of allowing the first secure relay server to request the second secure relay server to delegated authenticate the mobile terminal and allowing the first secure relay server to join a multicast group of the second secure relay server; a third step of allowing the second secure relay server to transmit a foreign group key and multicast address information to the first secure relay server, after the second secure relay server accepts to delegated authenticate the mobile terminal; and a fourth step of allowing the second secure relay server to transmit multimedia stream to the mobile terminal using the foreign group key and allowing the mobile terminal to remote-subscribe to the second secure relay server.

It is to be understood that both the foregoing general description and the following detailed description of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The present invention will now be described more fully with reference to the accompanying drawings, in which exemplary embodiments of the invention are shown. The invention may, however, be embodied in many different forms and should not be construed as being limited to the embodiments set force herein, rather, these embodiments are provided so that this disclosure will be thorough and complete, and will fully convey the concept of the invention to those skilled in the art.

Figure 1:
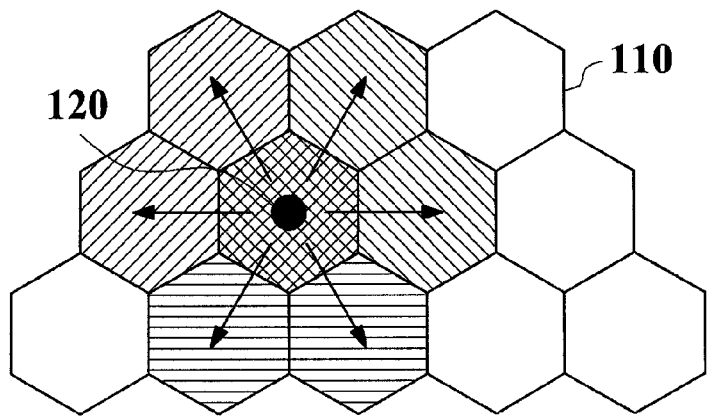
FIG. 1 illustrates directions in which a mobile user can move and cell regions in a mobile environment according to the present invention.

FIG. 1 illustrates directions in which a mobile user can move and cell regions in a mobile environment according to the present invention.

As shown in FIG. 1, in a wireless environment, a mobile user 120 can move in every direction, and it is difficult to predict the direction in which a user will move. If a cell 110, to which wireless services are provided, is represented as a hexagon, a user can move to one of six adjoining cells 110. Moreover, circumstantial conditions such as signal strength or number of access points make it more difficult to predict the direction.

In the method of managing a mobile multicast key using a foreign group key according to the present invention, six adjoining cells are classified as candidates for a mobile user to move to, and a foreign group key is temporarily allocated to the cells, which are separately managed. In addition, the present invention uses concepts of a primary group key and a foreign group key to separate group key management for a moving user from that for a local user. In this way, it is possible to minimize regions which group keys are required to be updated for and disconnection or delay in services which occurs in the case of movement of a mobile terminal 120.

And also, the present invention uses a strategy of prior service-post management of movement, in consideration that multicast is for large-capacity transmission in realtime. And the present invention enables the mobility-supporting functions to be centralized not in a mobile terminal, but in security relay servers, thus minimizing the difficulties resulting from the limit to the computing amount and network bandwidth of a mobile terminal.

Figure 2:
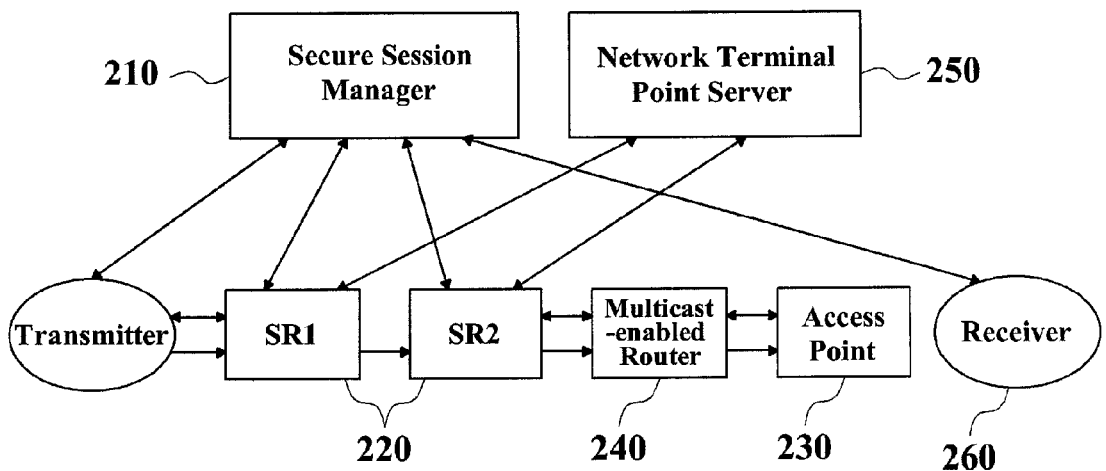
FIG. 2 is a drawing in which security function is applied to mobile multicast according to the present invention.

FIG. 2 is a drawing in which security function is applied to mobile multicast according to the present invention.

Referring to FIG. 2, a method of managing a mobile multicast key using a foreign group key according to the present invention requires the following components: a secure session manager 210 for transmitting an initial value of a session key for secure communication among secure relay servers; mobile multicast secure relay (SR) server 220 for managing a local group key; an access point (AP) 230 for transmitting microwaves; a multicast-enabled router 240 for having control of joining and leaving a multicast group; a network terminal point (NTP) server 250; and a receiver 260 for receiving data, i.e., a mobile terminal.

Figure 3:
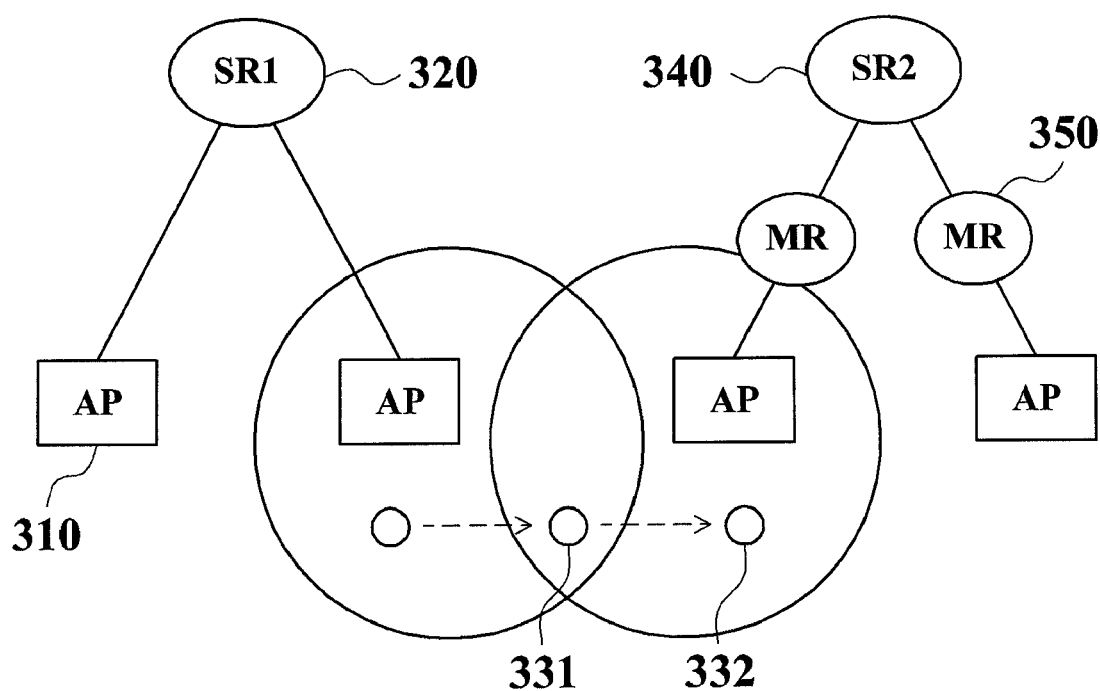
FIG. 3 illustrates a construction of access points and secure relay servers in the method of managing a mobile multicast key using a foreign group key according to the present invention.

FIG. 3 illustrates a construction of access points and secure relay servers in a method of managing a mobile multicast key using a foreign group key according to the present invention.

Figure 4:
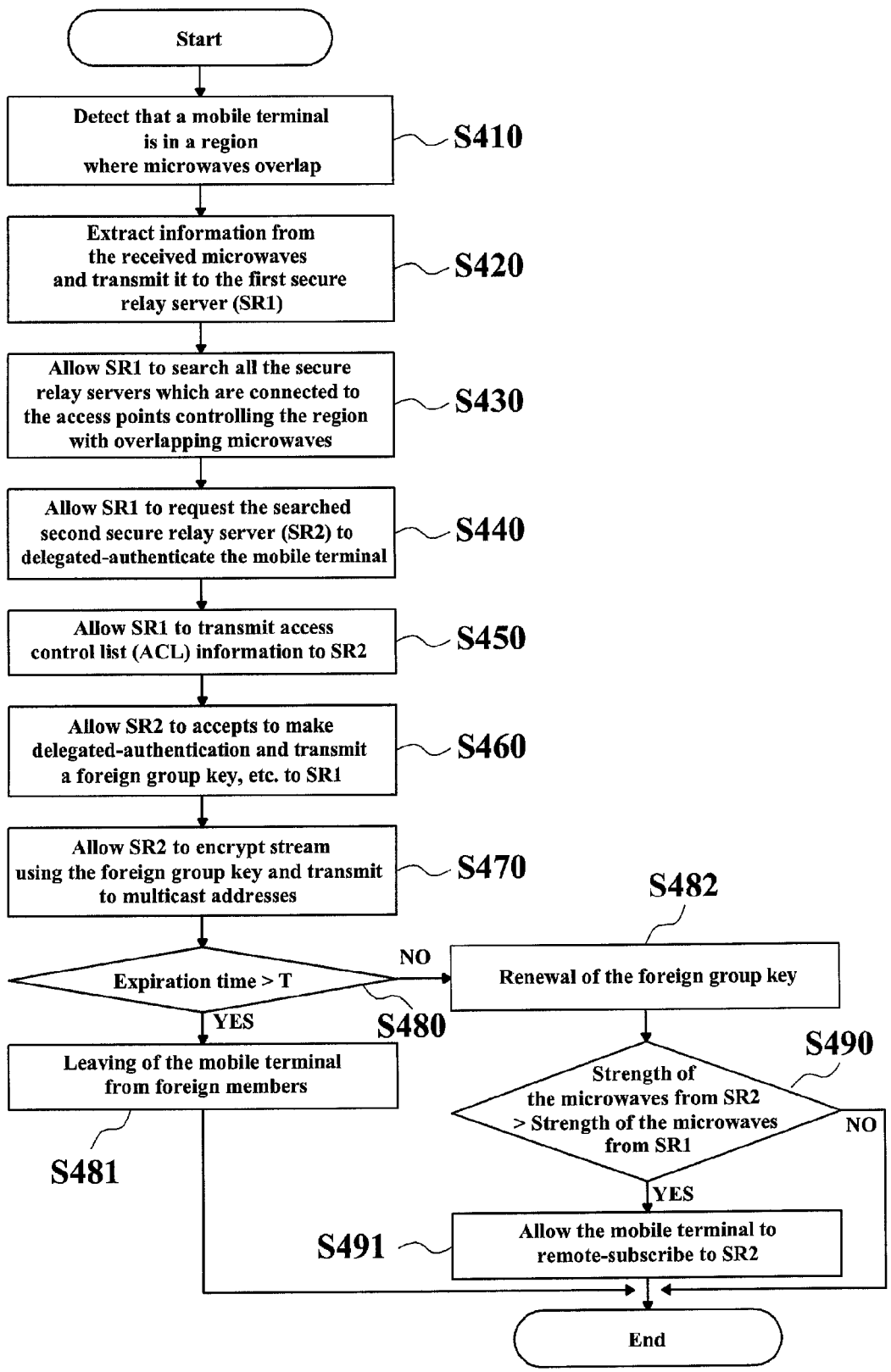
FIG. 4 is a flowchart which shows usage of a group key and delegated authentication for a mobile terminal, according to the present invention.

FIG. 4 is a flowchart which shows usage of a group key and delegated authentication for a mobile terminal, according to the present invention.

According to one embodiment of the present invention, an access point 310 broadcasts advertisement messages, which are periodically transmitted from a secure relay server and include internet protocol version 6 (IPv6) prefix information in case of IPv6 and a network address and class information in case of internet protocol version 4 (IPv4).

In the region where the microwaves from access points overlap, a mobile terminal 331 measures strength of the microwaves it receives and detects that it is in the region where the microwaves from access points overlap in 410. And the mobile terminal collects information of service set identifiers (SSID) and media access control (MAC) addresses of the access points to extract therefrom information such as an IPv6, strength of the microwave and so on.

And the mobile terminal 331 transmits to a domestic secure relay server 320 the collected information about the access points which control the region with overlapping microwaves in 420. A domestic secure relay server is referred to as a first secure relay server and a first secure relay server is a secure relay server which a mobile terminal currently subscribes to.

In S430, the first secure relay server 320 uses its function of managing location information to search a list of all the secure relay servers connected to the access points which control the region with overlapping microwaves in an access point (AP)—secure relay server (SR) mapping table. At this time, the function of managing location information includes the function of managing AP-SR mapping table and domestic and foreign mobile terminals.

The first secure relay server 320 requests the searched second secure relay server 340 to delegated authenticate the mobile terminal on behalf of the mobile terminal in S440, and joins the multicast group of the second secure relay server 340. The first secure relay server 320 transmits access control list (ACL) information to the second secure relay server 340 through a secure channel between the secure relay servers, in S450. At this time, the ACL information includes information of a peculiar identifier of the mobile terminal and an individual key (not a user's password) to be used for distributing a multicast group key, and the secure channel is encrypted using a session key. And to avoid confusions resulting from deliberately repetitive requests for delegated authentication or similar strengths of microwaves, a delay time (30 seconds~1 minute) is set between requests for delegated authentication.

The second secure relay server 340 accepts to delegated authenticate the mobile terminal, and then transmits to the first secure relay server 320 a foreign group key, an individual key of the mobile terminal issued by the searched second secure relay server 340 and the multicast address information of the second secure relay server, in S460. At this time, if the second secure relay server 340 continues to use the individual key of the first secure relay server 320, instead of transmitting the individual key of the mobile terminal 330, an overhead can be reduced.

The second secure relay server 340 encrypts multimedia stream using the foreign group key and transmits it to the corresponding multicast addresses in S470. The foreign group key is a temporary group key for the mobile terminal 331 and thus has an expiration time, as shown in S480. If an expiration time is less than 10 seconds, the foreign group key are updated periodically (at intervals of 10~20 seconds) in S482, and if an expiration time is 10 seconds or more than 10 seconds, a group key update process is performed as the mobile terminal does not any more belong to foreign members in S481. Since foreign members are much less than domestic members, an overhead for updating foreign group keys following joining and leaving foreign members is reduced. Further, foreign group keys can be updated by analyzing security and capability issues and choosing a proper group key management policy.

The mobile terminal 331 receives the stream message from the secure relay server with the intenser microwave between the first secure relay server 331 and the second secure relay server 340, and decrypts the stream message using the group key from the secure relay server with the intenser microwave. During the time, stream messages are being transmitted from the first secure relay server 320 and all the searched secure relay servers. The respective secure relay servers transmit to their multicast addresses the streams which are encrypted with different group keys (a foreign group key and a primary group key).

If the second secure relay server has the most intense microwave as shown in S490, the mobile terminal 332 remote-subscribes to the second secure relay server 340 in S491. In case that a mobile user moves so fast to pass through more than one regions where microwaves overlap or in case that a problem in mobility service occurs, remote-subscription is performed without foreign membership authentication. And if a user happens to move to an access point which does not have a secure relay server or has a problem in operation of a secure relay server, function of tunneling must be provided.

Table 1 shows membership management of a mobile terminal in accordance with the present invention.

TABLE 1

Membership management of a mobile terminal

| member type | general member | temporary member |
|---|---|---|
| membership classification | domestic membership | foreign membership |
| group key | primary group key | foreign group key |
| Individual key for distributing a group key | distributing a new individual key to a mobile terminal in a place to which the mobile terminal has moved | continuing to use an individual key in a place to which the mobile terminal has moved |

The second secure relay server 340 allocates an internet protocol (IP) address to the mobile terminal 332, which tries remote-subscription to the second secure relay server. A mobile terminal needs a real IP address to join a multicast group. To reduce time required to allocate an IP address, the first secure relay server 320 detects in advance if an IP address pool set randomly overlaps or not. In case of an IPv6, multicast-enabled router (MR) 350 periodically advertises IPv6 prefix information, and a host address can be calculated using function of address auto configuration. Since the first secure relay server has received an individual key from the second secure relay server 340 through delegated authentication, there is no need to distribute an individual key through lightened L authentication. When remote-subscription is successful, the second secure rely server 340 registers location information of the mobile terminal 332 and informs the other secure rely servers of that. And a session manager (SM) can periodically search location information of the mobile terminal 442 from the secure relay server so as to detect connection by an overlapping user. This is for preventing an overlapping user from being connected, protecting against conspiracy, and blocking subscription of a masquerade host. In addition, the mobile terminal 332 can move without being chased, thus making anonymity service possible.

After remote-subscription is completed, a leave message is transmitted to the first secure relay server 320 to which the mobile terminal has subscribed before moving, and the mobile terminal 332 periodically transmits 'alive' messages to the second secure relay server 340 to notify that the mobile terminal is in a normal receipt condition.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

A method of managing a mobile multicast key using a foreign key according to the present invention has an advantage that multicast secure relay servers perform delegated authentication in advance in a region where microwaves overlap, thus reducing a delay time for authentication in a mobile terminal.

And it has an advantage that it can minimize an effect from changes in group keys that user's movement make, by using a primary group key and a foreign key. This results in a reduction of an overhead from update of a group key while moving, and accordingly a reduction of a delay time.

In addition, it has an advantage that it centralizes functions of key management to a secure relay server, thus overcoming the limitations on processing ability or network bandwidth of a mobile terminal.

What is claimed is:

1. A method of managing a mobile multicast key using a foreign key, comprising:

a first step of allowing a first secure relay server to search a list of secure relay servers which are connected to the access point controlling a region where microwaves to a mobile terminal overlap, to find a second secure relay server, the mobile terminal currently subscribing to the first secure relay server;

a second step of allowing the first secure relay server to request the second secure relay server to delegated authenticate the mobile terminal on behalf of the mobile terminal and allowing the first secure relay server to join a multicast group of the second secure relay server;

a third step of allowing the second secure relay server to transmit a foreign group key and multicast address information to the first secure relay server, after the second secure relay server accepts to delegated authenticate the mobile terminal; and a fourth step of allowing the second secure relay server to transmit multimedia stream to the mobile terminal using the foreign group key and allowing the mobile terminal to remote-subscribe to the second secure relay server.

2. The method of claim 1, wherein the fourth step further comprising:

a step of allowing the second secure relay server to encrypt the multimedia stream using the foreign group key and to transmit the encrypted multimedia stream to the multicast addresses;

a step of decrypting the multimedia stream using the foreign group key, the multimedia stream being transmitted from the secure relay server of which microwave is the intenser between the first secure relay server and the second secure relay server; and a step of allowing the mobile terminal to remote-subscribe to the second secure relay server, if the microwave of the second secure relay server is the intenser.

3. The method of claim 2, wherein the step of allowing the mobile terminal to remote-subscribe to the second secure relay server further comprising:

a step of allowing the second secure relay server to allocate an internet protocol (IP) address to the mobile terminal and allowing the mobile terminal to try remote-subscribing to the second secure relay server;

a step of allowing the first secure relay server to receive a leave message from the mobile terminal, when the mobile terminal completes remote-subscription to the second secure relay server; and a step of allowing the second secure relay server to periodically receive from the mobile terminal a message confirming that the mobile terminal has a normal receipt condition.

4. The method of claim 1, wherein the second step further comprising:

a step of allowing the first secure relay server to transmit an access control list which comprises information of an identifier peculiar to the mobile terminal and an individual key to be used for distributing a multicast group key.

5. The method of claim 4, wherein the first secure relay server requests the second secure relay server to delegated authenticate the mobile terminal with a delay time.

6. The method of claim 1, wherein the third step further comprising:

a step of transmitting an individual key of the mobile terminal issued by the second secure relay server, to the first secure relay server.

7. The method of claim 1, wherein the foreign group key has an expiration time and is updated at intervals of at least 10 to 20 seconds.

8. The method of claim 7, further comprising:

a step of updating a group key as the mobile terminal does not any more belong to foreign members, when the mobile terminal does not move on for the expiration time or more than the expiration time.

* * * * *